United States Patent [19]

Fettweis

[11] Patent Number: 5,452,466
[45] Date of Patent: Sep. 19, 1995

[54] METHOD AND APPARATUS FOR PREFORMING DCT AND IDCT TRANSFORMS ON DATA SIGNALS WITH A PREPROCESSOR, A POST-PROCESSOR, AND A CONTROLLABLE SHUFFLE-EXCHANGE UNIT CONNECTED BETWEEN THE PRE-PROCESSOR AND POST-PROCESSOR

[75] Inventor: Gerhard Fettweis, Berkeley, Calif.

[73] Assignee: Teknekron Communications Systems, Inc., Berkeley, Calif.

[21] Appl. No.: 60,228

[22] Filed: May 11, 1993

[51] Int. Cl.⁶ .............................................. G06F 17/14
[52] U.S. Cl. .................... 395/800; 364/DIG. 1; 364/DIG. 2; 364/260.4; 364/725
[58] Field of Search ............ 364/DIG. 1, DIG. 2, 364/715.01, 715.02, 724.01, 724.04, 724.12, 725, 726, 727, 728, 728, 728.01, 827, 841; 395/375, 500

[56] References Cited

U.S. PATENT DOCUMENTS

| 4,853,887 | 8/1989 | Jutand et al. | 364/784 |
| 4,899,300 | 2/1990 | Jutand et al. | 364/725 |
| 5,270,832 | 12/1993 | Balkanski et al. | 358/432 |

OTHER PUBLICATIONS

Hsieh S. Hou, "A Fast Recursive Algorithm For Computing the Discrete Cosine Transform," IEEE Transactions on Acoustics, Speeches and Signal Processing, vol. ASSP-35, No. 10, pp. 1455–1461 (Oct. 1987).

Jutand, et al., "A 13.5 MHz Single Chip Multiformat Discrete Cosine Transform," SPIE, vol. 845, Visual Communications and Image Processing II, pp. 6–12 (1987).

Demassieux, et al., "An Optimized VLSI Architecture for a Multiformat Discrete Cosine Transform," ICASSP 87, pp. 547–550 (1987).

Mou, et al., "A High-speed Low-cost DCT Architecture for HDTV Applications," ICASSP 91, pp. 1153–1156 (1991).

Noll, "2.1 Semi-systolic Maximum Rate Transversal Filter with Programmable Co-efficients," Internatioanl Workshop on Systolic Arrays, pp. 103–112 (1986).

Primary Examiner—Robert B. Harrell
Attorney, Agent, or Firm—Limbach & Limbach

[57] ABSTRACT

A method and apparatus for implementing a discrete cosine transform (DCT) or an inverse DCT (IDCT) with a single hardware unit which applies only positive valued multiplicative coefficients and can be switched to either perform a DCT or an IDCT. The invention processes parallel input digital data signals to produce parallel output digital data signals which represent a discrete transform (either a DCT or an IDCT) of the input data. One aspect of the invention is a method and apparatus for performing discrete transforms using a multiplier which implements MSB-first, bit-serial, carry-save, multiplication of an input word by a positive fixed coefficient. In one class of embodiments, the serially received digits of the input word can take on positive values only. In other embodiments, the serially received digits of the input word can take on positive or negative values. Performance of MSB-first carry-save multiplication allows the design of extremely efficient transforming hardware having low processing delay and high precision, and supporting medium to low speed transform rates. Another aspect of the invention is a method and apparatus for performing discrete transforms using a butterfly addition/subtraction circuit which receives two serial signals and generates both the sum and difference of such signals. In one class of embodiments, the inventive butterfly addition/subtraction circuit implements MSB-first, bit-serial addition and subtraction. In other embodiments, the inventive butterfly addition/subtraction circuit implements LSB-first, bit-serial addition and subtraction.

19 Claims, 7 Drawing Sheets

ADDER ARCHITETURE

FIG. 14
(PRIOR ART)

ADDITION (NOT MSB)

METHOD AND APPARATUS FOR PREFORMING DCT AND IDCT TRANSFORMS ON DATA SIGNALS WITH A PREPROCESSOR, A POST-PROCESSOR, AND A CONTROLLABLE SHUFFLE-EXCHANGE UNIT CONNECTED BETWEEN THE PRE-PROCESSOR AND POST-PROCESSOR

FIELD OF THE INVENTION

The invention relates to methods and apparatus for performing a time to frequency domain transform, or a frequency to time domain transform, on a set of input data signals. More particularly, the invention relates to methods and apparatus for performing a discrete cosine transform or an inverse discrete cosine transform on a set of input data signals.

BACKGROUND OF THE INVENTION

Forward discrete cosine transforms ("DCT operations" or "DCT transforms") are a well known class of discrete time to frequency domain transforms. Inverse discrete cosine transforms ("IDCT operations" or "IDCT transforms") are a well known class of discrete frequency to time domain transforms. DCT and IDCT operations (sometimes referred to herein collectively as "discrete transform" operations or "discrete transforms") are employed to transform input data signals in many applications, with their specifications set by international standards bodies.

In voice and image compression systems, input signals are often transformed by DCT circuitry because the DCT transform is very well suited for decorrelating real-valued signals and concentrating their information content in low frequency components.

DCT and IDCT operations are used in video conferencing in accordance with the standard established by the CCITT Recommendation H.261. DCT and IDCT operations are also used for still image transmission in accordance with the JPEG standard set by the International Standardization Organization (ISO). DCT and IDCT operations are also used for transmission of moving images in accordance with the MPEG standard also set by ISO.

All application areas mentioned above require the calculation of a DCT as well as its inverse transform, the IDCT. Furthermore, in many cases either data are being compressed, requiring the DCT, or data are being decompressed, requiring the IDCT, but not both at the same time. To save on hardware complexity an implementation should therefore be designed such that it can be programmed to execute either the DCT or the IDCT. For image processing, a further requirement is that the implementation must be able to execute a two-dimensional DCT or IDCT. Due to the fact that this is typically accomplished by carrying out two sets of one-dimensional DCTs (or IDCTs) in sequence, this requirement translates (in the case that one DCT hardware unit is time-shared for both sets of one-dimensional DCTs) to the fact that the hardware should allow for a minimum number of wait cycles between the first and second set of one-dimensional transformations.

The computation of DCT and IDCT transforms are well known in the art. In "A Fast Recursive Algorithm For Computing The Discrete Cosine Transform" by Hsieh S. Hou, published in the *Transactions on Acoustics, Speech and Signal Processing*, Vol. ASSP-35, No. 10, October, 1987 (p. 455–61), it was proposed that a recursive algorithm be used for computing a fast discrete cosine transform (either a fast forward discrete cosine transform or a fast inverse discrete cosine transform). One embodiment, shown in FIGS. 1 and 2 on page 1459 of the Hou article, employs a basic two point forward discrete cosine transform processing element. Hou does not disclose a universal processing element, in the sense of a single processing element used for all calculations of a forward discrete cosine transform. Because the processing element disclosed in Hou is not a uniform processing element, the apparatus disclosed in Hou cannot be modularly expanded to process input data signals having higher order number.

U.S. patent application Ser. No. 720,202, filed Jun. 24, 1991, and U.S. patent application Ser. No. 07/847,195, now abandoned, filed Mar. 6, 1992, both entitled "Method and Apparatus to Transform Time to Frequency and Frequency to Time of Data Signals" (and assigned to the assignee of the present application) also disclose methods and apparatus for performing N-point DCT and IDCT operations. However, these methods and apparatuses require multiple processing iterations to perform each DCT or IDCT transform, and thus may be unsuitable for achieving high transform rates.

Another known technique for performing a DCT transform is to perform full matrix multiplication, using a multiply-accumulate unit for each DCT coefficient which needs to be computed. For slowing down the computation rate, solutions have been proposed which use bit-serial arithmetic, distributed arithmetic, or which apply a time-sharing strategy of the multiply-accumulate units.

Figure 1:
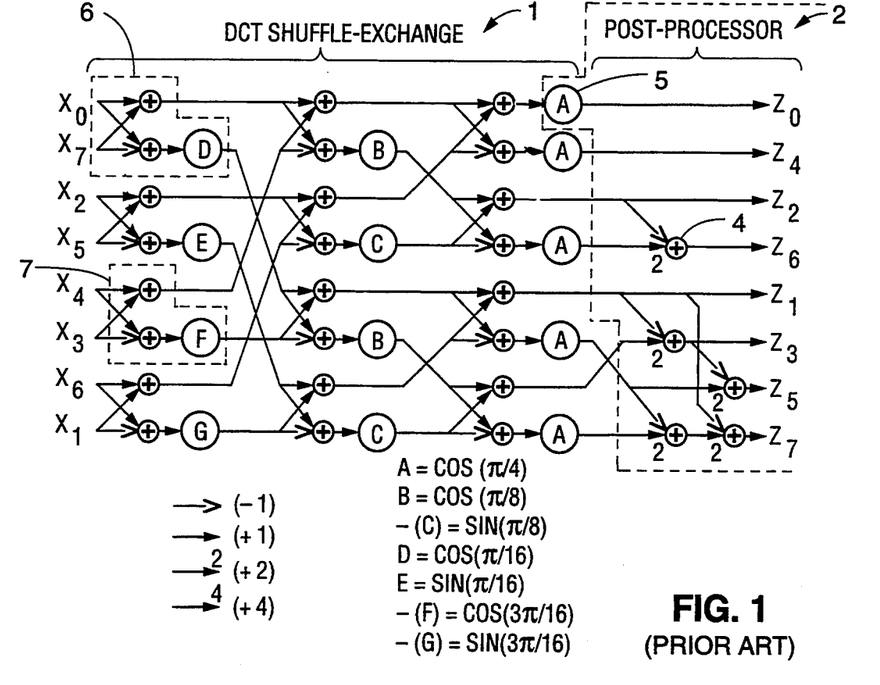
FIG. 1 is a block diagram of a conventional circuit for performing a DCT transform.

Another known technique for performing a DCT (or an IDCT) transform employs an integrated circuit designed by mapping a Fast Fourier Transform-like (FFT-like) decomposed flow of a DCT (or IDCT) transform directly into silicon. FIG. 1 is a simplified block diagram of such a conventional circuit for implementing a DCT transform. In response to each set of eight parallel input data values ($x_0-x_7$), the FIG. 1 circuit outputs eight parallel data values ($z_0-z_7$) representing a DCT transform of the input data. The circuit of FIG. 1 has two functional blocks: DCT shuffle-exchange processor 1 consisting of twelve identical butterfly circuits (or "units") 6; followed by post-processor 2 consisting of five subtraction circuits 4 and a fixed-coefficient multiplication unit (identified by the symbol A). Each butterfly circuit 6 includes an adder circuit, a subtraction circuit, and a fixed-coefficient multiplication unit. Four of the multiplication units are identified by the symbol A, two by the symbol B, two by the symbol C, and one each by the symbols D, E, F, and G. The multiplier circuits identified by symbols A, B, C, D, E, F, and G multiply their input values by fixed coefficients $A = \cos(\pi/4)$, $B = \cos(\pi/8)$, $C = -\sin(\pi/8)$, $D = \sin(\pi/16)$, $E = \sin(\pi/16)$, $F = -\cos(3\pi/16)$, and $G = -\sin(3\pi/16)$, respectively.

The FIG. 1 circuit implements every step of the DCT operation using a hardware unit. The hardware units are connected as shown in FIG. 1. If data values $x_0-x_7$ are simultaneously asserted bits of an eight bit parallel word, several such eight bit words can be simultaneously subjected to a DCT transform by simultaneously applying them to a set of identical FIG. 1 circuits connected in parallel. Equivalently, each data value $x_j$ can be a multi-bit parallel word, with each butterfly unit 6 of FIG. 1 designed to implement bit-parallel arithmetic simultaneously on all bits of each word $x_j$. With parallel processing of several input words, execution of a new DCT (to transform several words) can be started at each clock cycle, resulting in an extremely high transform rate.

For medium speed applications (requiring lower transform rates), the architecture of FIG. 1 can also be used. If only a lower overall processing rate is required, fewer FIG. 1 circuits can be connected in parallel (e.g., a single FIG. 1 circuit can be employed), each data value $x_j$ can represent a fewer number of parallel bits (e.g., a single bit), and bit-serial (or distributed) arithmetic can be implemented in each addition, subtraction, and multiplication unit of FIG. 1. For example, a single FIG. 1 circuit can be employed with each input line (e.g., the input line labeled $x_0$ or the input line labeled $x_7$) sequentially receiving the bits of a different serial input word, and each butterfly unit of shuffle-exchange circuit 1 serially processing the sequentially received bits.

Regardless of the particular design of each addition, subtraction, and multiplication unit thereof, the FIG. 1 design for a DCT processor is very simple and straightforward. FIG. 1 employs no control means, and the lack of a control means allows the DCT data-flow dependence graph to be directly interpreted as a data-flow architecture.

Figure 2:
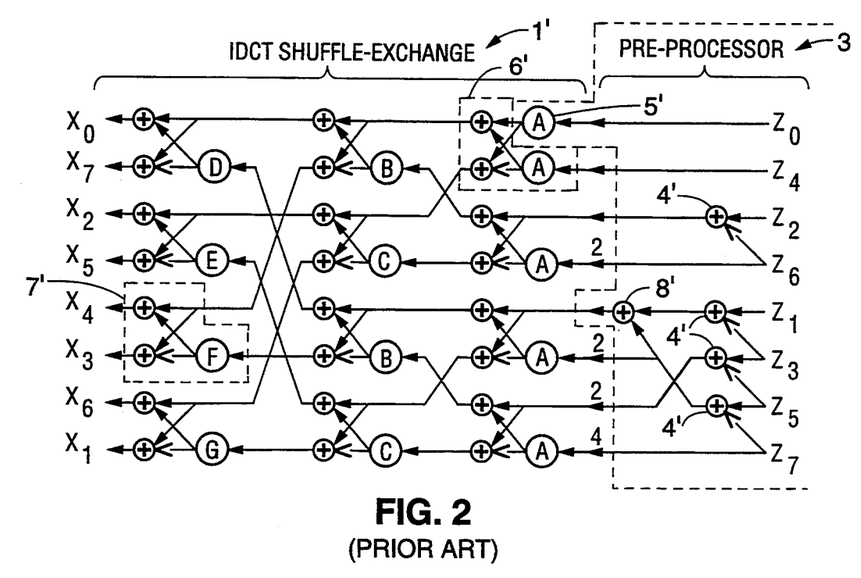
FIG. 2 is a block diagram of a conventional circuit for performing an IDCT transform.

FIG. 2 is a simplified block diagram of a conventional circuit (similar to the FIG. 1 circuit) for implementing an IDCT operation. In response to each set of eight parallel input data values ($z_0-z_7$), the FIG. 2 circuit outputs eight parallel data values ($x_0-x_7$) representing an IDCT transform of the input data. The circuit of FIG. 2 has two functional blocks: pre-processor 3 (consisting of four subtraction units 4', one addition unit 8' and a fixed-coefficient multiplication unit identified by the symbol A) followed by IDCT shuffle-exchange processor 1' (consisting of twelve identical butterfly units 6'). Each unit 6' includes an addition circuit, a subtraction circuit, and a fixed-coefficient multiplication unit. Five of the multiplication units apply multiplicative coefficient A, two apply multiplicative coefficient B, two apply multiplicative coefficient C, and one each applies multiplicative coefficient D, E, F, and G. The same notation employed in FIG. 1 is employed in FIG. 2.

The basic functional block of the shuffle-exchange unit of FIG. 1 (and the shuffle-exchange unit of FIG. 2, which is identical to that of FIG. 1) is a butterfly unit comprising a subtraction/addition circuit pair connected to a multiplier. As in FIG. 1, the multiplicative coefficients C, F, and G are fixed negative values, and the other multiplicative coefficients are fixed positive values. For the reasons explained below, the design of FIGS. 1 and 2 unnecessarily increases the cost and complexity of each multiplier circuit of each butterfly unit of the FIG. 1 and 2 circuits. In preferred embodiments of the present invention, this disadvantage of the prior art is eliminated because the multipliers of the inventive apparatus apply only positive multiplicative coefficients.

A major problem with designing a single data-flow architecture for performing both DCT and IDCT operations is that the IDCT operational flow very much resembles the DCT flow, but only if the direction of data flow is drawn in the reversed direction (as can be seen by comparing FIG. 1 to FIG. 2). Thus, a combined DCT and IDCT architecture must be able to modify its data flow significantly from a DCT to an IDCT operation.

SUMMARY OF THE INVENTION

In preferred embodiments, the invention is a method and apparatus for processing parallel input digital data signals to produce parallel output digital data signals which represent a discrete transform (either a DCT or an IDCT) of the input data. The inventive apparatus can be controlled to perform either a DCT or an IDCT operation on a set of input data. The invention reduces the cost and complexity of the apparatus for performing a discrete transform because each multiplier employed therein applies only a positive multiplicative coefficient to the input data (or partially processed input data) it receives. This advantage results regardless of whether the addition, subtraction, and multiplication units of the apparatus implement bit-serial or bit-parallel arithmetic, but the advantage is relatively greater in embodiments implementing bit-serial arithmetic.

Two or more identical versions of the inventive apparatus can be connected in an array to perform a two-dimensional IDCT (or two-dimensional DCT) on an array of input data signals (for example, an $8 \times 8$ array of eight-bit input words).

One aspect of the invention is a method and apparatus for performing discrete transforms using a multiplier which implements MSB-first, bit-serial, carry-save, multiplication of an input word by a positive fixed coefficient. In one class of embodiments, the serially received digits of the input word can take on positive values only. In another class of embodiments, the serially received digits of the input word can take on positive or negative values.

Another aspect of the invention is a method and apparatus for performing discrete transforms using a butterfly addition/subtraction circuit for receiving serial signals x and y and generating both the signal $x+y$ and the signal $x-y$ therefrom. In one class of embodiments, the inventive butterfly addition/subtraction circuit implements MSB-first, bit-serial addition and subtraction. In another class of embodiments, the inventive butterfly addition/subtraction circuit implements LSB-first, bit-serial addition and subtraction.

DETAILED DESCRIPTION OF THE PREFERRED EMBODIMENTS

A preferred embodiment of the inventive apparatus for implementing either a DCT operation or an IDCT operation will be described with reference to FIGS. 5 through 10. An important feature of this embodiment is that it implements a word-level modification of conventional data flow (data flow in the apparatus of FIGS. 1 and 2) to enable the inventive apparatus to apply positive multiplier coefficients only during a DCT or an IDCT operation. This feature of the invention stems from the observation that it is less complex to implement a fixed coefficient multiplier with positive coefficients than with negative coefficients. Hence, the invention employs modified butterfly circuits in which each multiplier applies a positive coefficient only (the circuits perform necessary multiplications by the factor negative one, in effect, but without applying any negative multiplicative coefficient).

Figure 4:
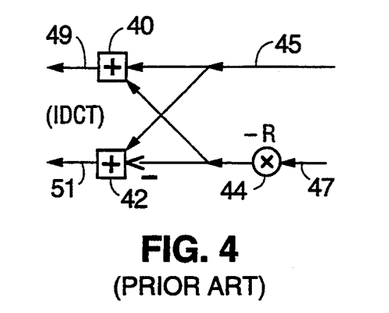
FIG. 4 is a block diagram of a conventional butterfly circuit of the FIG. 2 circuit.
Figure 5:
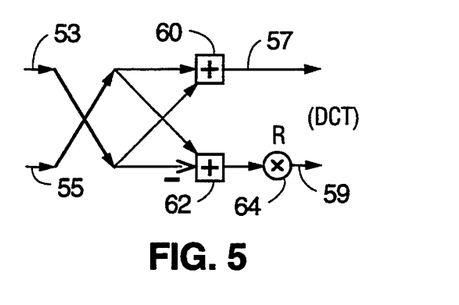
FIG. 5 is a block diagram of a butterfly circuit embodying the invention for use in a DCT circuit.
Figure 6:
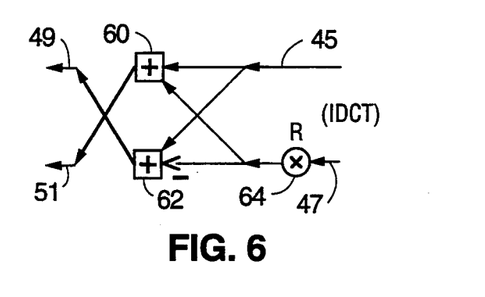
FIG. 6 is a block diagram of a butterfly circuit embodying the invention for use in an IDCT circuit.

One embodiment of the inventive butterfly circuit is shown in FIG. 5. The FIG. 5 circuit is intended to replace the conventional circuit of FIG. 3 (the latter circuit applies a negative multiplicative coefficient, −R, in a DCT operation). Another embodiment of the inventive butterfly circuit is shown in FIG. 6. The FIG. 6 circuit is intended to replace the conventional circuit of FIG. 4 (the latter circuit applies a negative multiplicative coefficient, −R, in an IDCT operation). In both FIGS. 5 and 6, the value of the positive, fixed, multiplier coefficient is denoted by R.

Figure 3:
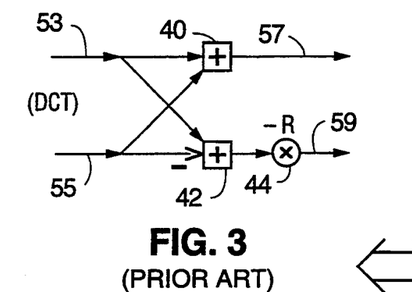
FIG. 3 is a block diagram of a conventional butterfly circuit of the FIG. 1 circuit.

The circuits of FIGS. 4 and 6 both implement the same logical operation on a pair of input bits, and the circuits of FIGS. 3 and 5 both implement the same logical operation on a pair of input bits. For example, in FIG. 4, in response to bit $x_i$ received on line 45 and bit $x_j$ received on line 47, multiplier 44 will output $-Rx_j$ to both adder 40 and subtraction unit 42, adder 40 will output $x_i - Rx_j$ on line 49, and subtraction unit 42 will output $x_i + Rx_j$ on line 51. In FIG. 6, in response to the same bit $x_i$ received on line 45 and the same bit $x_j$ received on line 47, multiplier 64 will output $+Rx_j$ to both adder 60 and subtraction unit 62, adder 60 will output $x_i + Rx_j$ on line 51, and subtraction unit 62 will output $x_i - Rx_j$ on line 49.

Figure 9:
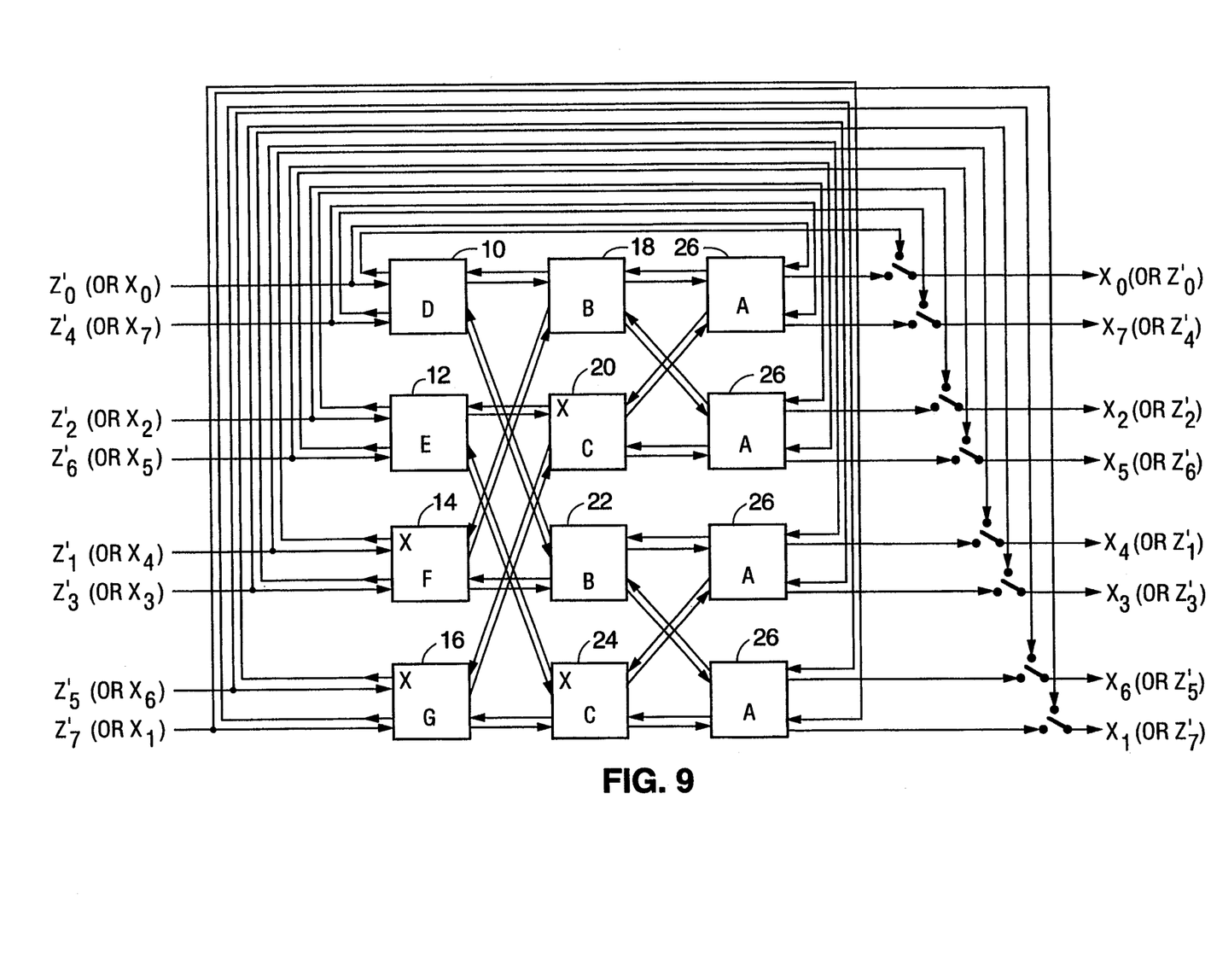
FIG. 9 is a block diagram of an embodiment of a switchable 8-point embodiment of the inventive shuffle-exchange apparatus, for use in an apparatus for performing both DCT and IDCT operations.
Figure 10:
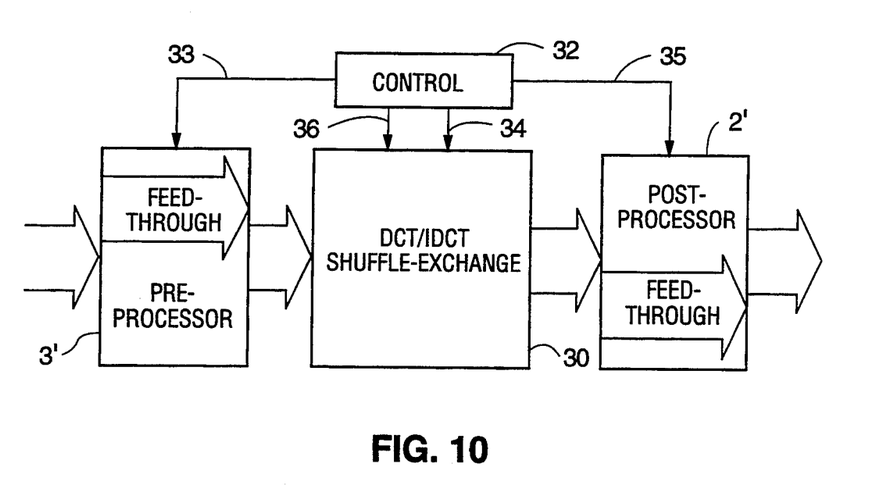
FIG. 10 is a block diagram of a preferred embodiment of the inventive apparatus for performing both DCT and IDCT operations.

Since both DCT and IDCT shuffle-exchange units perform the same operations, although not in the same direction of data flow, the inventive shuffle-exchange circuit shown in FIG. 9 shares the same hardware for both DCT and IDCT operations and uses multiplexers to switch into a desired mode of operation (either a DCT mode or an IDCT mode) in response to an externally generated control signal (such as control signal 34 shown in FIG. 10).

Figure 7:
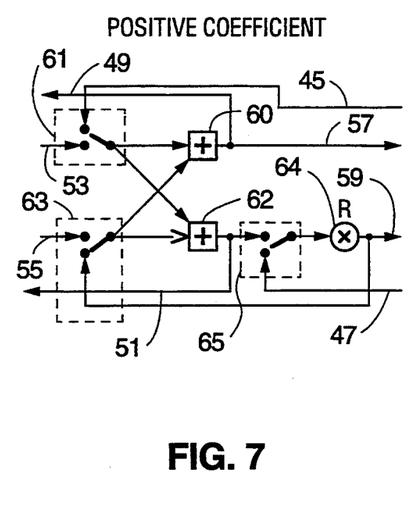
FIG. 7 is a block diagram of a butterfly circuit embodying the invention for applying a positive multiplicative coefficient in either a DCT or an IDCT operation.
Figure 8:
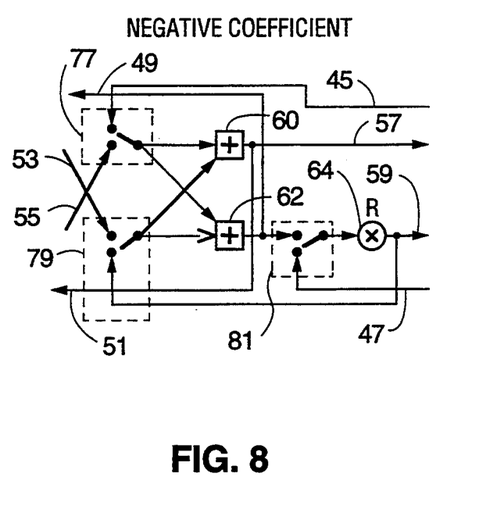
FIG. 8 is a block diagram of a preferred implementation of the FIG. 5 circuit, for applying a negative multiplicative coefficient in either a DCT or an IDCT operation.

The FIG. 9 embodiment employs two slightly different types of butterfly units: the type shown in FIG. 7 (i.e., units 10, 12, 18, 22, and 26, each replacing a conventional butterfly unit applying a positive multiplier coefficient); and the type shown in FIG. 8 (i.e., units 14, 16, 20, and 24, each of replacing a conventional butterfly unit applying a negative multiplier coefficient). Because the butterfly units employed in FIG. 9 apply only positive multiplier coefficients, the complexity of the multiplier of each butterfly unit is reduced significantly.

As can easily be seen, the generalization of the data flow architecture of FIG. 9 for N-point DCT/IDCT operations (with N being a power of 2) is simple and straightforward. For example, to implement a 16-point DCT or IDCT operation, two identical FIG. 9 circuits can be connected in parallel to receive, process, and output sixteen data values in parallel, rather than eight as in FIG. 9.

In variations on the FIG. 9 embodiment, the inventive shuffle-exchange apparatus includes a P×Q array of butterfly units (where P and Q are integers). Each butterfly unit can be of the type (such as that shown in FIG. 7) which replaces a conventional butterfly unit applying a positive multiplier coefficient), or the type (such as that shown in FIG. 8) which replaces a conventional butterfly unit applying a negative multiplier coefficient.

FIG. 7 is a preferred embodiment of the inventive butterfly circuit which can be controlled to operate in either a DCT or an IDCT mode (so that the FIG. 7 circuit can be used in a DCT/IDCT shuffle-exchange unit, for example as a circuit 10, 12, 18, 22, or 26 in the FIG. 9 apparatus). In a DCT mode, a control signal is applied to switches 61, 63, and 65 (e.g., control signal 34 from control unit 32 shown in FIG. 10), to cause switch 61 to connect line 53 with inputs of addition unit 60 and subtraction unit 62, to cause switch 63 to connect line 55 with the other inputs of units 60 and 62, and to cause switch 65 to supply the output of unit 62 to the input of multiplier 64 (so multiplier 64 will multiply the output of unit 62 by coefficient R). In an IDCT mode, a control signal is applied to switches 61, 63, and 65 (e.g., another control signal 34 from control unit 32 of FIG. 10), to cause switch 65 to connect line 47 with the input of multiplier 64 (so multiplier 64 will multiply input data received on line 47 by coefficient R), to cause switch 63 to connect the output of multiplier 64 with inputs of units 60 and unit 62, and to cause switch 61 to connect line 45 with the other inputs of units 60 and 62.

FIG. 8 is a preferred implementation of the FIG. 5 circuit which can be controlled to apply a negative multiplicative coefficient (−R) in either a DCT or an IDCT operation. Thus, the FIG. 8 circuit can be used in a DCT/IDCT shuffle-exchange unit, for example as a circuit 14, 16, 20, or 24 in the FIG. 9 apparatus. In a DCT mode, a control signal is applied to switches 77, 79, and 81 of FIG. 8 (e.g., control signal 34 from control unit 32 shown in FIG. 10), to cause switch 79 to connect line 53 with inputs of units 60 and 62, to cause switch 77 to connect line 55 with the other inputs of units 60 and 62, and to cause switch 81 to supply the output of unit 62 to the input of multiplier 64 (so multiplier 64 will multiply the output of unit 62 by coefficient R). In an IDCT mode, a control signal is applied to switches 77, 79, and 81 (e.g., another control signal 34 from control unit 32 of FIG. 10), to cause switch 81 to connect line 47 with the input of multiplier 64 (so multiplier 64 will multiply input data received on line 47 by coefficient R), to cause switch 79 to connect the output of multiplier 64 with inputs of units 60 and unit 62, and to cause switch 77 to connect line 45 with the other inputs of units 60 and 62.

With circuits of the FIG. 7 type employed as circuits 10, 12, 18, 22, and 26, and circuits of the FIG. 8 type employed as circuits 14, 16, 20, and 24, the shuffle-exchange circuit of FIG. 9 can be controlled to operate in either a DCT or an IDCT mode. To implement a complete DCT/IDCT data flow processor, the shuffle-exchange unit of FIG. 9 can be employed as shuffle-exchange unit 30 of FIG. 10. In FIG. 10, unit 30 is connected between pre-processor 3' and post-processor 2' (as shown in FIG. 10). Pre-processor 3' can be identical to conventional pre-processor 3 shown in FIG. 2, and post-processor 2' can be identical to conventional post-processor 2 shown in FIG. 1. Since both pre-processor 3' and post-processor 2' will typically have very low complexity, it is preferable not to share arithmetic hardware between the two of them.

The overall DCT/IDCT architecture of FIG. 10 consists of a pipeline of pre-processor 3', switchable shuffle-exchange unit 30 (which can be identical to the FIG. 9 circuit) which receives the output of pre-processor 3', and post-processor 2' which receives the output of shuffle-exchange unit 30. Both pre-processor 3' and post-processor 2' have a transparent feed-through mode. Control unit 32 (which can be a general purpose digital computer) supplies control signal 33 to pre-processor 3' to cause pre-processor 3' to operate in either an IDCT mode (in which it partially inversely-transforms parallel input data and supplies the partially inversely-transformed data to unit 30) or its transparent feed-through mode (a DCT mode). Similarly, control unit 32 supplies control signal 35 to post-processor 2' to cause post-processor 2' to operate in either a DCT mode (in which it receives partially forward-transformed parallel data from unit 30 and generates fully forward-transformed parallel data therefrom) or its transparent feed-through mode (an IDCT mode). Control unit 32 also supplies control signal 34 to shuffle-exchange unit 30, to cause it to operate in either a DCT or an IDCT mode. Control unit 32 also supplies control signals 36 to unit 30 (specifically, to those multipliers and addition/subtraction units within unit 30 which require such control signals). Control signals 36 can include the LSB-control signal and MSB-control signal discussed below with reference to FIG. 13, and the MSB-control signal discussed below with reference to FIG. 16.

Thus, a user can configure the FIG. 10 system in a DCT mode (in which pre-processor 3' operates in its transparent feed-through mode) or an IDCT mode (in which post-processor 2' operates in its transparent feed-through mode). If the shuffle-exchange unit of FIG. 9 is employed as unit 30 in FIG. 10, and if control signal 34 causes unit 30 to operate in its IDCT mode, then butterfly units 10, 12, 14, and 16 receive partially transformed bits $z'_0-z'_7$ (resulting from prior processing of input bits $z_0-z_7$ in pre-processor 3', assuming that control signal 33 has caused pre-processor 3' to operate in its IDCT mode), and butterfly units 26 output parallel bits $x_0-x_7$ (which represent an IDCT transform of bits $z_0-z_7$). Bits $x_0-x_7$ are then passed through post-processor 2' without undergoing further processing.

If the same shuffle-exchange unit is employed as unit 30 in FIG. 10, and if control signal 34 causes unit 30 to operate in its DCT mode, then butterfly units 10, 12, 14, and 16 receive input bits $x_0-x_7$ (which have been passed through pre-processor 3'), and butterfly units 26 output parallel, partially transformed bits $z'_0-z'_7$. Bits $z'_0-z'_7$ are then processed in post-processor 2' to convert them into output bits $z_0=z_7$ (which represent a DCT transform of bits $x_0-x_7$), assuming that control signal 35 has caused post-processor 2' to operate in its DCT mode.

Figure 11:
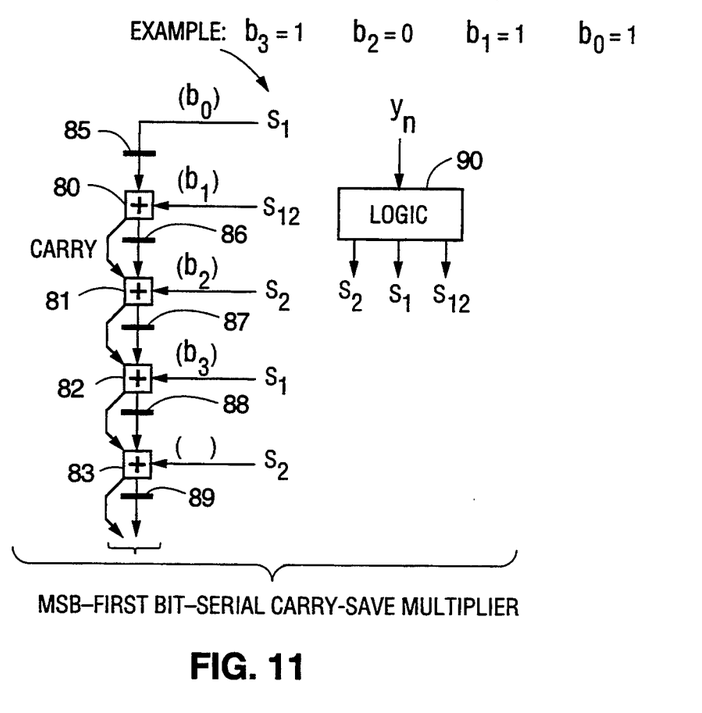
FIG. 11 is a block diagram of the inventive bit-serial, MSB-first multiplier (for multiplying positive numbers by a coefficient).
Figure 13:
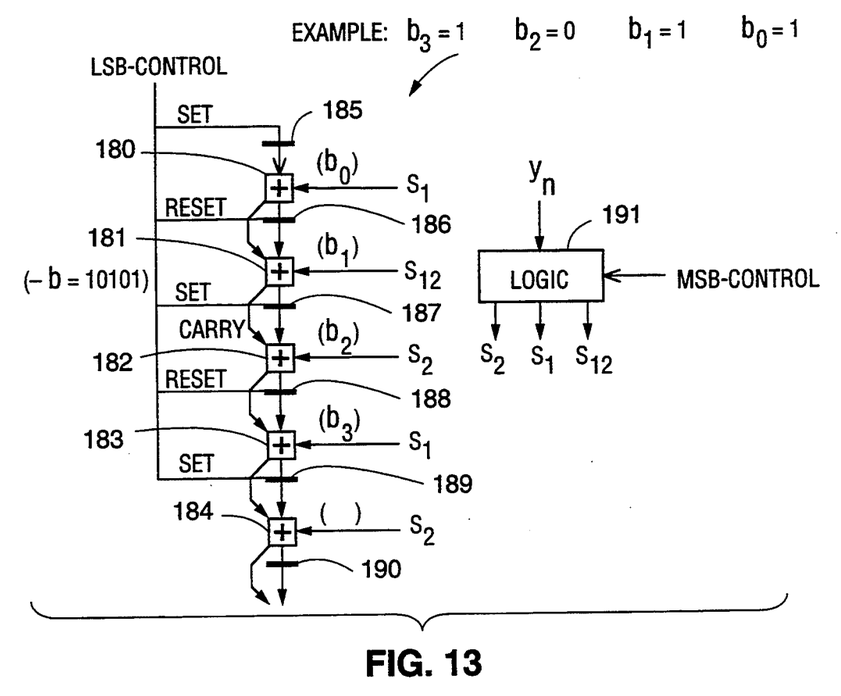
FIG. 13 is a block diagram of the inventive bit-serial, MSB-first multiplier (for multiplying negative or positive numbers by a coefficient).

Next, with reference to FIGS. 11 and 13, we describe preferred implementations of above-discussed multiplier 64.

If transform speed requirements are not high enough to justify a bit-parallel implementation of multiplier 64, the algorithm implemented by the FIG. 9 apparatus can be folded at the bit-level, leading to a bit-serial (or nibble-serial) architecture for each multiplier 64 (and addition unit 60 and subtraction unit 62) employed therein.

In general, the advantages of a bit-serial implementation are that wiring overhead becomes almost negligible since only one or two wires need to be routed per interconnection. This is in great contrast to a word-level design, where large buses of the width of the word length need to be routed between parallel processing elements. In processor-based designs in which each multiplier is reused for the computation of many different coefficients, the multiplier must be much more complex than a fixed coefficient multiplier. In general, in a processor-based design the hardware must be more flexible (and complex) because it is re-used for different word-level operations, whereas in a bit-serial design hardware is reused at the bit-level for the same operation only.

In a bit-serial architecture the bits of one word are processed serially, either starting from the most significant bit (MSB) or the least significant bit (LSB). These two methods are referred to as MSB-first or LSB-first, respectively. A decision on which method is better cannot generally be made, but must be examined for each problem individually. The decision basically depends on the pipeline and type of arithmetic operations which are carried out on the data, going from the input to the output. As explained above, DCT/IDCT operations are characterized by a sequence of additions/subtractions and fixed-coefficient multiplications. Since the multiplications of the DCT/IDCT shuffle-exchange processor present the most complex arithmetic operations, it is necessary to examine them more closely.

Without rounding, each fixed-coefficient multiplication has the effect of increasing the wordlength of the input data by the wordlength of the coefficient minus one. Hence, it is necessary to cut-off or round the intermediate multiplication results. For a required input/output wordlength W and a coefficient wordlength V, the multiplication result will have $W+V-1$ bits. An LSB-first multiplier will produce the $(V-1)$ LSBs first, but these bits are only used for the rounding operation and are not transmitted to the next arithmetic unit for further processing. This results in an undesirable latency lag-time of V−1 clock cycles, and also leads to more buffering hardware. If an apparatus processes two bits at the same time (in a nibble-serial mode) as in some conventional arithmetic processing circuits, the lag-time is reduced to (V−1)/2, but the lag-time is still not negligible and depends on the wordlength. Furthermore, the lag-time also affects the throughput rate if no additional buffering is introduced.

In an MSB-first multiplier design, the MSB of the multiplication result is available at the output after one clock cycle, independent of the wordlengths of the input data and fixed coefficient. Thus, in the present context, for reasons of low latency and small hardware complexity, an MSB-first multiplier design has clear advantages over an LSB-first design. However, it must be taken into account that an MSB-first, carry-save (or signed digit) design always requires two wires per interconnection instead of only one.

Figure 12:
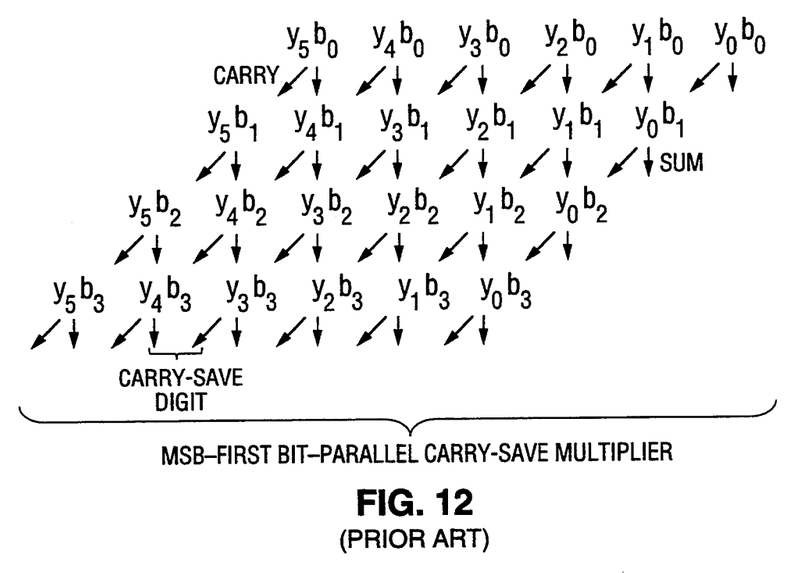
FIG. 12 is a diagram of a bit-parallel, MSB-first carry-save multiplication operation.

The FIG. 11 embodiment of the inventive MSB-first, bit-serial, carry-save fixed coefficient multiplier is designed for multiplying an input word y (which can take on positive values only) by a multiplicative coefficient b (which can take on positive values only). The fixed coefficient multiplier of FIG. 11 can be understood by considering the folding of the corresponding bit-parallel multiplier dependency (shown in FIG. 12) onto the bit-serial architecture of FIG. 11. Each of FIGS. 11 and 12 represents a simple example of multiplication of an input y (having wordlength W=6, and comprising six digits $y_0$, $y_1$, $y_2$, $y_3$, $y_4$, and $y_5$) by a positive fixed coefficient b (a binary word having wordlength V=4 and comprising four bits $b_0=1$, $b_1=1$, $b_2=0$, and $b_3=1$). FIG. 11 assumes that input y and coefficient b both have positive values.

In carry-save arithmetic, the carry is not propagated from bit-level to bit-level, but is saved and kept, together with the sum bit of the same weight $2^n$, as a carry-save digit $y_n$. This leads to a redundant number representation in which at each bit-level the digit $y_n$ can take on either the value 0 (both the sum and carry are 0), or 1 (either the sum or carry is 1), or 2 (both the sum and carry are 1). These three representations are encoded into three variables, $s_1$, $s_{12}$, $s_2$, as follows: if $y_n=00$, then $s_1=0$, $s_{12}=0$, and $s_2=0$; if $y_n=01$ or 10, then $s_1=1$, $s_{12}=1$, and $s_2=0$; and if $y_n=11$, then $s_1=0$, $s_{12}=1$, and $s_2=1$. Because the FIG. 11 circuit implements carry-save multiplication, each of input word digits $Y_n$ in a preferred embodiment of FIG. 11 comprises two binary bits (i.e., $y_n=00$, 10, 01, or 11) which are simultaneously processed. The FIG. 11 multiplier implements carry-save multiplication although it internally propagates a carry bit from bit-level to bit-level (as shown in FIG. 11) to achieve smaller hardware complexity.

The inventive MSB-first, bit-serial, fixed coefficient multiplier of FIG. 11 includes logic circuit 90 for sequentially receiving input data digits $y_0$, $y_1$, $y_2$, $y_3$, $y_4$, and $y_5$ in order of MSB to LSB, and outputting a triplet of encoded values $s_1$, $s_{12}$, $s_2$ in response to each input data digit. The FIG. 11 circuit also includes registers 85, 86, 87, 88, and 89 (each of which is a single-cycle delay circuit), and adders 80, 81, 82, and 83.

In operation, registers 85, 86, 87, 88, and 89 of the FIG. 11 circuit are initially cleared. Then, in response to each input data digit $Y_n$, logic unit 90 generates corresponding bits $s_1$, $s_{12}$, and $s_2$; bit $s_1$ is stored in register 85; adder 80 adds the bit previously stored in register 85 to bit $s_{12}$, stores the result in register 86, and asserts the carry bit to adder 81; adder 81 adds the bit previously stored in register 86 to bit $s_2$, stores the result in register 87, and asserts the carry bit to adder 82; adder 82 adds the bit previously stored in register 87 to bit $s_1$, stores the result in register 88, and asserts the carry bit to adder 83; adder 83 adds the bit previously stored in register 88 to bit $s_2$, stores the result in register 89, and asserts the carry bit.

To add a different coefficient b to the same input word y, the FIG. 11 circuit would be modified by supplying the bits $s_1$, $s_{12}$, and $s_2$ to different ones of adders 80–83 in accordance with the following table A:

TABLE A

| $b_n$ | $b_{n-1}$ | Added Value |
|---|---|---|
| 0 | 0 | 0 |
| 0 | 1 | $s_2$ |
| 1 | 0 | $s_1$ |
| 1 | 1 | $s_{12}$ |

The MSB-first, bit-serial multiplier of FIG. 11 calculates the partial products sequentially as $y_5b, y_4b, \ldots y_0b$ and accumulates them to the final result. Since the values of $y_n$ can take on the values 0(00), 1 (10 or 01), or 2 (11), either 0, or b, or 2b needs to be added. When looking at the n-th bit-level of the accumulation, this leads to the fact that either 0, $b_n$, or $b_{n-1}$ is added. Depending on the values of $b_n$ and $b_{n-1}$, either 0, $s_1$, $s_{12}$, or $s_2$ needs to be used as an input.

Next, with reference to FIG. 13, we describe a preferred embodiment of the inventive MSB-first, bit-serial, carry-save fixed coefficient multiplier for multiplying input word y (which can take on either positive or negative values) by multiplicative coefficient b (which can take on positive values only).

To appreciate the FIG. 13 design, consider that a W-bit, signed, 2's—complement number's value is $$y = -y_{W-1}2^{W-1} + \sum_{j=0}^{W-2} y_j 2^j \qquad (2)$$

This leads to the multiplication equation of $$y \times b = - \sum_{i=0}^{V-1} b_i y_{W-1} 2^{W-1+i} + \sum_{i=0}^{V-1} \sum_{j=0}^{W-2} b_i y_j 2^i + j \qquad (3)$$

The negative signed part of this equation can be included into the double-sum, by reformulating it to $$- \sum_{i=0}^{V-1} b_i y_{W-1} 2^{W-1+i} = \qquad (4)$$

$$\sum_{i=0}^{V-1} b_i(2 - y_{W-1})2^{W-1+i} - \sum_{i=0}^{V-1} b_i 2^{W+1}$$

Since $y_{W-1}$ is a carry-save digit, comprised of two bits, $2 - y_{W-1}$ is exactly the negation (or $1^s$—complement) of $y_{W-1}$. The multiplication therefore can be carried out as with positive numbers only, if the MSB of y is inverted as it enters the multiplier, and if the multiplier result is compensated by adding $$- \sum_{i=0}^{V-1} b_i 2^{W+i} = -2b \qquad (5)$$

to the result. This can be accomplished by pre-loading the registers of the bit-serial multiplier of FIG. 13 with this correction term $-2b$ (in 2's—complement).

The bit-serial multiplication algorithm implemented by FIG. 13 can therefore be written as the execution of the following steps:

| 1. | $-2b$ | |
|---|---|---|
| 2. | $+(2 - y_{W-1})b$ | shift left |
| 3. | $+y_{W-2}b$ | shift left |
| . | | |
| . | | |
| W. | $+y_1 b$ | shift left |
| W + 1. | $+y_0 b$ | shift left. |

By viewing the algorithm steps it can be seen that the bit-serial multiplier hardware therefore is nearly identical with that of the positive arithmetic architecture of FIG. 11. The FIG. 13 embodiment differs from the FIG. 11 embodiment by employing an MSB-control signal to execute the second line of algorithm (6) set forth in the previous paragraph.

In an embodiment for multiplying the same input word y and coefficient b as does the FIG. 11 circuit, logic circuit 191 of the FIG. 13 apparatus sequentially receives input data digits $y_0$, $y_1$, $y_2$, $y_3$, $y_4$, and $y_5$ in order of MSB to LSB, and outputs a triplet of encoded values $s_1$, $s_{12}$, $s_2$ in response to each input data digit. The FIG. 13 apparatus also includes registers 185, 186, 187, 188, 189, and 190 (each of which is a single-cycle delay circuit), and adders 180, 181, 182, 183, and 184.

In operation, registers 185, 186, 187, 188, and 189 of the FIG. 13 circuit are initially set to $-2b$ (before beginning the multiplication). Then, in response to each input data digit $Y_n$, logic unit 191 generates corresponding bits $s_1$, $s_{12}$, and $s_2$; adder 180 adds the bit previously stored in register 185 to bit $s_1$, stores the result in register 186, and asserts the carry bit to adder 181; adder 181 adds the bit previously stored in register 186 to bit $s_{12}$, stores the result in register 187, and asserts the carry bit to adder 182; adder 182 adds the bit previously stored in register 187 to bit $s_2$, stores the result in register 188, and asserts the carry bit to adder 183; adder 183 adds the bit previously stored in register 188 to bit $s_1$, stores the result in register 189, and asserts the carry bit to adder 184; and adder 184 adds the bit previously stored in register 189 to bit $s_2$, stores the result in register 190, and asserts the carry bit.

To add a different coefficient b to the same input word y, the FIG. 13 circuit would be modified by supplying the bits $s_1$, $s_{12}$, and $s_2$ to different ones of adders 180–184 in accordance with the following table B:

TABLE B

| $b_n$ | $b_{n-1}$ | Added Value |
|---|---|---|
| 0 | 0 | 0 |
| 0 | 1 | $s_2$ |
| 1 | 0 | $s_1$ |
| 1 | 1 | $s_{12}$ |

To save one step in the execution of the algorithm, the FIG. 13 can accomplish the initial setting of registers 185–189 by using a correct combination of set/reset registers, controlled by a control signal. Immediately after this initial step (in the MSB iteration), the incoming $y_{W-1}$ must be inverted. It is therefore obvious that two control signals are required: one signal (identified as "LSB-control" in FIG. 13) which indicates the last (LSB) step of a multiplication, for setting the registers to $-2b$ for the following multiplication; and another signal (identified as "MSB-control" in FIG. 13) for indicating the first (MSB) step of the multiplication for causing $y_{W-1}$ to be inverted. The MSB-control signal is the same as the LSB-control signal, delayed by one clock cycle.

FIG. 13 is the preferred architecture of the inventive bit-serial, positive fixed coefficient, MSB-first multiplier for signed carry-save input. In FIG. 13, the MSB-control signal is supplied to logic unit 191 which outputs the signals $\{s_1, s_{12}, s_2\}$, and the LSB-control signal sets/resets registers 185–189 in the multiplier. Those of ordinary skill in the art will recognize that some of adders 180–184 can be replaced by half-adders (e.g., adder 180, in the example where $b_0=1$, $b_1=1$, $b_2=0$, and $b_3=1$). Furthermore, register 185 which is used only to delay the "set input" to adder 180 can be eliminated, if the MSB-control signal is used instead.

The data flow of the FIG. 13 multiplier architecture is pure feedforward. The critical path is the carry-generation in the adder chain, running from LSB to MSB. Therefore, to decrease the length of the critical path, either pipelining registers can be employed, or in case of latency minimization the carry-generation of fast adders can be applied (e.g., carry-look-ahead or carry-select). Since the sum output bits of the adder chain are buffered in registers, typically only the MSB carry-generation (the carry generation performed by adder 184) needs to be fast, but not the intermediate adder results.

Figure 16:
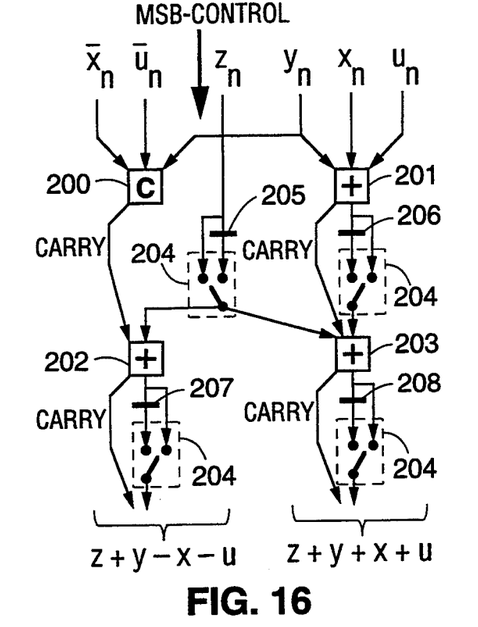
FIG. 16 is a block diagram of the inventive bit-serial, MSB-first butterfly addition/subtraction unit.

It should be appreciated that the inventive circuits of FIGS. 11, 13, and 16 implement bit-serial arithmetic, with the direction of the bit-serial processing carried out in the MSB-to-LSB (i.e., the "MSB-first" direction, where MSB denotes "most significant bit"), to achieve the high efficiency of bit-serial designs with the additional advantages of high numeric precision and low latency. As with any bit-serial design, any of various nibble-serial modifications of each of these embodiments can be carried out to achieve higher throughput rates.

A signed-input multiplier for applying a fixed negative (or positive) coefficient can be implemented by modifying the positive coefficient multiplier shown in FIG. 13. However, its complexity is much larger than that of the positive coefficient multiplier of FIG. 13, and it consumes two additional clock cycles latency (one for the sign, one for the more complex arithmetic). This emphasizes that in implementing a DCT or IDCT, it is much more advantageous to use the above-described data-flow architecture of the invention which applies only positive multiplicative coefficients.

It is also within the scope of the invention to employ the bit-serial, carry-save butterfly addition/subtraction circuit of FIG. 16 to implement pair of circuits 60 and 62 of FIGS. 5–8. The inventive butterfly addition/subtraction unit computes both the sum and the difference of two bit-serial input numbers. If the word-length is chosen to be large enough, then the precision is insignificantly affected by using one's—complement input values instead of two's—complement input values. This allows for a reduction in implementation of the logic.

Figure 14:
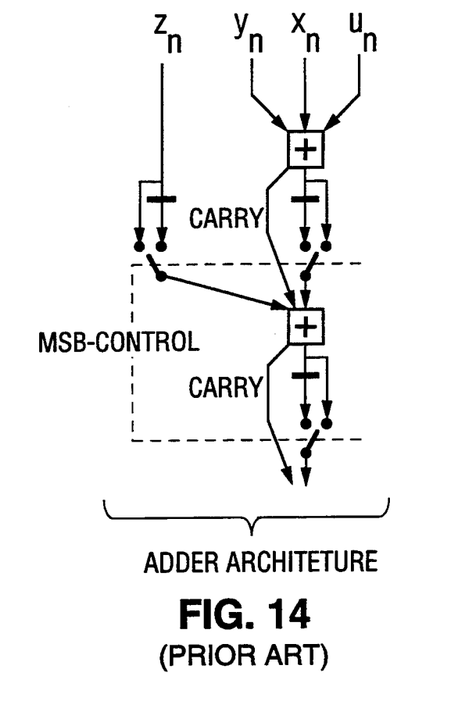
FIG. 14 is a block diagram of a circuit for bit-serial, MSB-first addition.
Figure 14A:
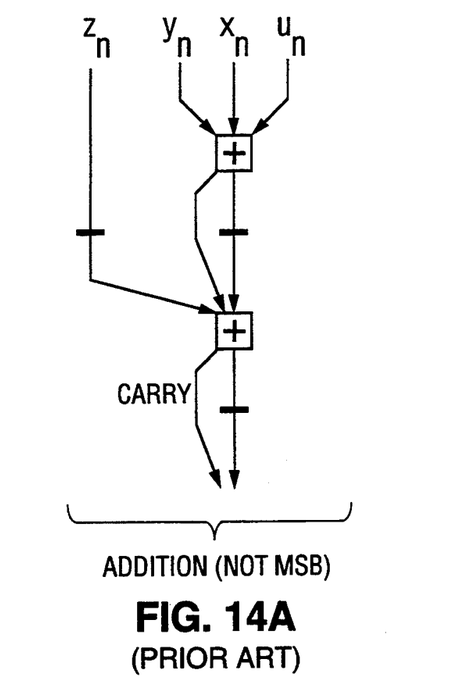
FIG. 14A is a block diagram of a circuit for bit-serial addition.
Figure 15:
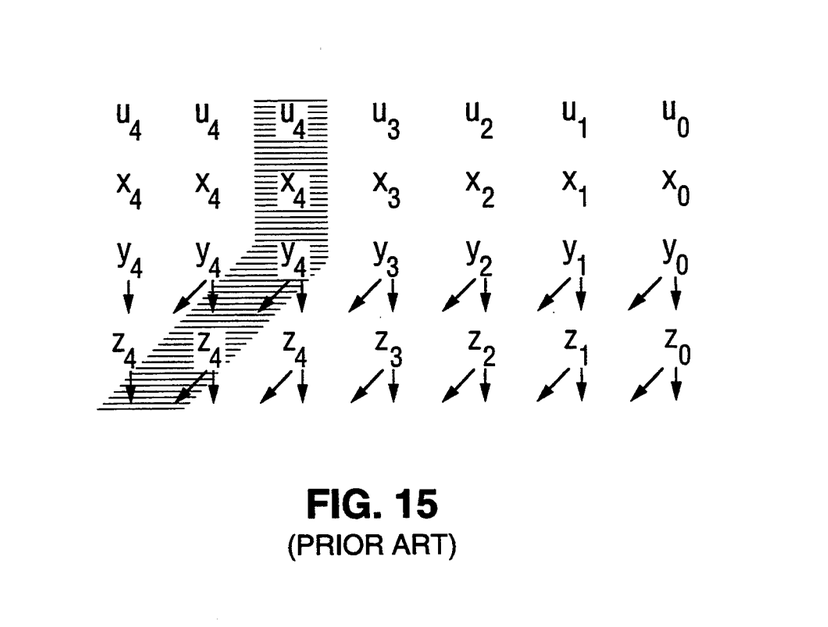
FIG. 15 is a diagram of a bit-parallel addition operation.

We first describe the conventional bit-serial adder architectures shown in FIGS. 14 and 14A, and the corresponding conventional bit-parallel addition operation shown in FIG. 15. If two signed carry-save numbers are added, this operation can be viewed as equivalent to addition of four signed binary numbers (numbers z, y, x, and u shown in FIGS. 14 and 14A, each comprising a set of digits $z_n$, $y_n$, $x_n$, and $u_n$). Each of such four numbers can be sign-extended by two bits, followed by a conventional 2's-complement addition.

In carry-save arithmetic, this addition is explained with reference to FIGS. 14 and 15 for a 5-bit example. A carry-save addition of the four numbers u, x, y, and z is shown in FIG. 15 in a bit-parallel way. This leads to the requirement of introducing two full-adders in the bit-serial implementation depicted in FIG. 14. It can be seen that FIG. 14 carries out its processing such that two steps of pipelining delay occur. This is also indicated in FIG. 15 by the shaded area in the bit-parallel addition, which represents one current window of operation of the bit-serial addition performed by FIG. 14. As can be seen, the MSB of the result can be asserted immediately upon availability of the MSB of the inputs. This is accomplished by short-circuiting all registers of the adder, which leads to the adder architecture shown in FIG. 14.

FIG. 14A is an example of a conventional architecture for implementing LSB-first addition of input words z, y, x, and u (rather than MSB-first addition as in FIG. 14).

Because the inventive butterfly addition/subtraction circuit of FIG. 16 executes the addition and subtraction of two identical inputs, it shares as much logic for these two operations as possible. If two inputs of a full-adder are inverted, the sum-bit remains unchanged. Since the subtraction of the inventive butterfly addition/subtraction circuit is tallied out with one's—complement, i.e. both bits of one input are inverted, the invention exploits the property mentioned in the previous sentence. Only the carry-bit needs to be generated for both cases. Furthermore, functional registers of the subtraction and addition can be shared (see $z_n$ in FIG. 16) which results in the reduced complexity architecture shown in FIG. 16.

Figure 17:
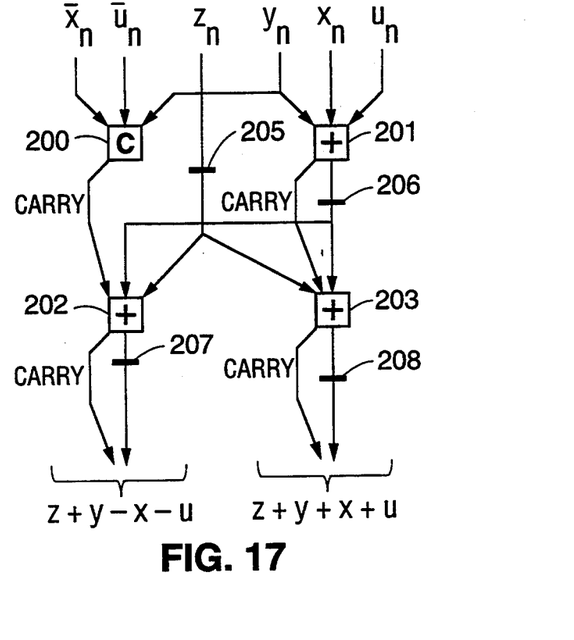
FIG. 17 is a block diagram of one configuration of the FIG. 16 circuit.

FIG. 16 is a preferred embodiment of the MSB-first, bit-serial butterfly addition/subtraction circuit of the invention. FIG. 17 is an equivalent circuit to that of FIG. 16 (with switches 204 of FIG. 16 set so as not to bypass registers 205, 207, and 208).

The FIG. 16 circuit includes carry generation circuit 200, full adders 201, 202, and 203, registers 205, 206, 207, and 208 (each of which is a single-cycle delay circuit), and four switches 204. The FIG. 16 circuit serially receives each of four sets of digits $z_n$, $y_n$, $x_n$, and $u_n$ (and the complements of digits $x_n$ and $u_n$), where each set of digits $z_n$, $y_n$, $x_n$, and $u_n$ determines one of signed binary numbers z, y, x, and u, and computes both the sum signal $z+y+x++u$ and the difference signal $z+y-x-u$. An MSB-control signal is supplied to switches 204 for the purpose of computing the MSB of the result with the help of the MSB of the inputs. Each of switches 204 is connected to receive both a non-delayed input (either input $z_n$, or the output of one of adders 201, 203, or 207) and a delayed version of the same input (each delayed input has been delayed by one clock cycle in one of registers 205, 206, 207, and 208).

In operation of the FIG. 16 circuit, during the first (MSB) cycle, the MSB-control signal causes all the switches 204 to be set such that registers 205, 207, and 208 are bypassed. The MSB of the result is available at the outputs $z+y+x+u$ and $z+y-x-u$, respectively. During the remaining clock cycles of processing one word bit-serially, all switches 204 are set such that no register is bypassed, and the circuit of FIG. 16 operates as does the circuit shown in FIG. 17 (with one of input digits $z_n$ supplied to register 205, one of input digits $y_n$ supplied to inputs of carry generation circuit 200 and full adder 201, one each of input digits $x_n$ and $u_n$ supplied to the two other inputs of full adder 201, and one each of the complements of input digit $x_n$ and $u_n$ supplied to the other two inputs of circuit 200, during each clock cycle).

Figure 18:
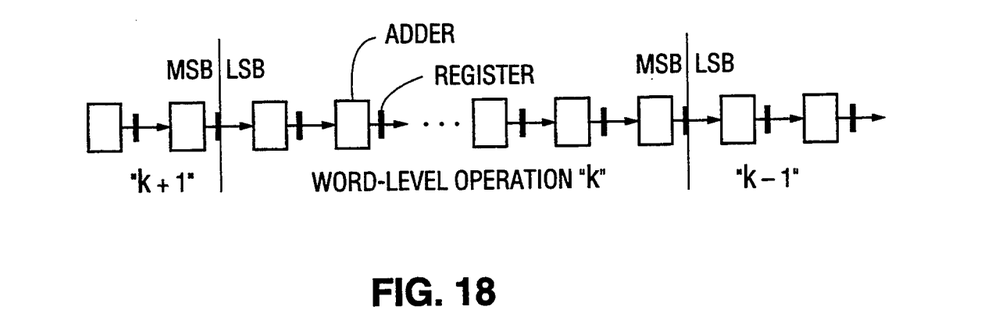
FIG. 18 is a diagram representing word-level wavefronts in a bit-serial processing pipeline.

To achieve a higher precision, the butterfly circuit of FIG. 16 can be modified according to the sign-extension method proposed in T. Noll, "Semi-Systolic Maximum Rate Transversal Filters with Programmable Coefficients," in International Workshop on Systolic Arrays, pp. 103–112, 1986. In this case only a single-digit sign-extension is carried out, which, however, results in a significant increase in the bit-serial addition/subtraction hardware complexity. The reason why such modification increases precision can be understood by considering FIG. 18.

In general, each W-digit carry-save number comprises two binary numbers, which can be merged (added) into one W-bit binary number. To ensure that the result has no sign-overrun, in case two carry-save numbers are added only one digit-level sign-extension is needed. In the above-described FIG. 16 and 17 circuits, the carry-save addition was carried out with a two-digit sign-extension, resulting in a simple hardware implementation. However, this two-digit extension means that the upper added digit was redundant. This redundant MSB leads to the fact that the MSB wavefront which proceeds through the hardware has skipped one more step ahead than necessary. In front of the MSB-wavefront of a bit-serial architecture, the LSB of the previous word-level computation is being processed. Therefore, if the MSB wavefront skips one step ahead, this results in a decrease of precision by one LSB. This is apparent from inspection of FIG. 18, which represents word-level wavefronts as vertical lines which move in a bit-serial processing pipeline from one adder-register circuit pair to another.

An important application of the inventive DCT/IDCT circuit of FIG. 9 is to reduce the complexity of a previously conceived processor-based 8-point DCT/IDCT system design, which has a latency of 32 clock cycles and is compliant with the H.261 recommendation. To avoid changing the input/output behavior of the previous system, an embodiment of the inventive circuit is employed (in place of corresponding components of the previous system) which completes an 8-point DCT (or IDCT) operations in 32 clock cycles. This latency constraint is met by the inventive MSB-first multiplication and MSB-first butterfly addition/subtraction circuit designs.

As mentioned above, if LSB-first multiplication were instead implemented, the first clock cycles would produce the LSB-part of the result which would be cut off due to rounding. These rounding clock cycles therefore effectively act as delay cycles, increasing the latency of the DCT/IDCT substantially. This added delay depends linearly on the wordlength of operation. In contrast, with the inventive MSB-first approach, the lower bits of the result are computed at the end, and the MSB is computed first, independent of the wordlengths used. Therefore the MSB is immediately available for the next computation which can begin without delay (not counting possible pipelining delays).

Due to the inventive MSB-first bit-serial processing, 32 available clock cycles are equivalent to 32 bits of precision. Each multiplier stage uses one clock delay, i.e. it eliminates one bit of precision. By considering the loss at the input and output buffers, the remaining wordlength is 24 bits. This is still more than necessary to meet H.261 precision requirements, and can be achieved by using the simple sign-extension butterfly addition/subtraction circuit of FIG. 16 in implementing the FIG. 9 circuit.

Although in the examples set forth above, the inventive apparatus implements DCT and IDCT operations, it can also be modified (in a manner apparent to those of ordinary skill in the art) to implement a wide variety of other time to frequency or frequency to time transforms, such as discrete sine transforms and fast Fourier transforms.

Various modifications in the structure and method of operation of the described embodiments are within the scope and spirit of this invention, and will be apparent to those skilled in the art. Although the invention has been described in connection with specific preferred embodiments, the invention as claimed should not be unduly limited to such specific embodiments.

What is claimed is:

1. An apparatus for processing input digital data to produce output digital data representing a discrete transform of the input digital data, including:

a pre-processor;

a post-processor;

a shuffle-exchange unit connected between the pre-processor and the post-processor, wherein the shuffle-exchange unit includes multipliers, wherein each of the multipliers applies a positive multiplicative coefficient to data received thereby, wherein the shuffle-exchange unit includes no multiplier which applies a negative multiplicative coefficient to data received thereby; and control means for supplying control signals to the shuffle-exchange unit, the pre-processor, and the post-processor, to cause the shuffle-exchange unit, the pre-processor, and the post-processor to enter a selected one of a first state and a second state, wherein in the first state, the pre-processor passes a first set of parallel input data signals to the shuffle-exchange unit, the shuffle-exchange unit generates parallel, partially forward-transformed data signals form the first set of parallel input data signals, and the post-processor receives the parallel, partially forward-transformed data signals therefrom, and wherein in the second state, the pre-processor generates a set of parallel, partially inverse-transformed data signals from a second set of parallel input data signals, and the shuffle-exchange unit receives the set of parallel, partially inverse-transformed data signals from the pre-processor and generates parallel, inverse-transformed output data signals therefrom.

2. The apparatus of claim 1, wherein the shuffle-exchange unit includes a P×Q array of butterfly units, where P and Q are integers, each of said butterfly units including one of said multipliers and a butterfly addition/subtraction circuit.

3. The apparatus of claim 2, wherein each said butterfly addition/subtraction circuit and each of the multipliers implements bit-serial arithmetic.

4. The apparatus of claim 2, wherein each said butterfly addition/subtraction circuit and each of the multipliers implements bit-parallel arithmetic.

5. The apparatus of claim 2, wherein each of the butterfly units includes switches which are switchable in response to the control signals between first positions in which the shuffle-exchange unit is in the first state, and second positions in which the shuffle-exchange unit is in the second state.

6. The apparatus of claim 2, wherein each of the multipliers includes means for implementing MSB-first, bit-serial, carry-save, multiplication of an input word by a positive fixed coefficient.

7. The apparatus of claim 2, wherein each said butterfly addition/subtraction circuit includes means for receiving two serial input signals, implementing MSB-first, bit-serial addition to generate a sum of the two serial input signals, and implementing MSB-first, bit-serial subtraction to generate a difference of the two serial input signals.

8. The apparatus of claim 1, wherein the parallel, forward-transformed output data signals represent a discrete cosine transform of the first set of parallel input data signals, and the parallel, inverse-transformed output data signals represent an inverse discrete cosine transform of the second set of parallel input data signals.

9. A shuffle-exchange circuit for use in a system for processing input digital data to produce output digital data representing a discrete transform of the input digital data, said shuffle-exchange circuit including a P×Q array of butterfly units, where P and Q are integers, each of said butterfly units including:

a butterfly addition/subtraction circuit for receiving two input signals, and generating a sum signal by summing the input signals, and generating a difference signal by subtracting one of the input signals from another of the input signals; and a multiplier connected to the butterfly addition/subtraction circuit for receiving the difference signal and including means for applying a positive multiplicative coefficient to the difference signal, wherein the shuffle-exchange circuit includes no multiplier which applies a negative multiplicative coefficient to any signal received thereby.

10. The circuit of claim 9, wherein each said butterfly addition/subtraction circuit and each said multiplier implements bit-serial arithmetic.

11. The circuit of claim 9, wherein each said butterfly addition/subtraction circuit and each said multiplier implements bit-parallel arithmetic.

12. The circuit of claim 9, wherein each of the butterfly units also includes:

a switch connected between the butterfly addition/subtraction circuit, wherein the switch has a forward transform position for passing the difference signal to an input of the multiplier, and an inverse transform position which disconnects the butterfly addition/subtraction circuit from the input of the multiplier and supplies a first input signal to said input of the multiplier.

13. The circuit of claim 9, wherein each said multiplier includes means for implementing MSB-first, bit-serial, carry-save multiplication of the difference signal by the positive multiplicative coefficient.

14. The circuit of claim 9, wherein each said butterfly addition/subtraction circuit includes means for implementing MSB-first, bit-serial addition to generate the sum signal, and means for implementing MSB-first, bit-serial subtraction to generate the difference signal.

15. A multiplier for use in a butterfly unit of a shuffle-exchange circuit of a system for processing input digital data to produce output digital data representing a discrete transform of the input digital data, said shuffle-exchange circuit including a P×Q array of butterfly units, where P and Q are integers, wherein said multiplier includes:

logic means for sequentially receiving input data digits of an input signal in MSB-to-LSB order, and outputting a set of encoded values in response to each of the input data digits; and a set of registers and adders connected in series, for receiving the encoded values and implementing MSB-first, bit-serial, carry-save multiplication of the input signal by a positive multiplicative coefficient.

16. The multiplier of claim 15, wherein each of the input data digits comprises two bits, and each said set of encoded values comprises three bits.

17. The multiplier of claim 15, wherein the input signal is a signed input signal, wherein the input signal is a binary signal, and also including:

means for pre-loading the registers of the multiplier of with a correction word having a value equal to the positive multiplicative coefficient multiplied by a factor of negative two.

18. A butterfly addition/subtraction circuit for implementing bit-serial, MSB-first addition and subtraction, for use in a butterfly unit of a shuffle-exchange circuit of a system for processing input digital data to produce output digital data representing a discrete transform of the input digital data, said shuffle-exchange circuit including a P×Q array of butterfly units, where P and Q are integers, wherein said butterfly addition/subtraction circuit includes:

a set of registers, each connected to receive an input signal and generate therefrom a delayed signal by delaying said input signal by one clock cycle; and a set of switches, each connected to receive both the input signal received by one of the registers and the delayed signal output from said one of the registers, wherein each of the switches selectively passes one of the input signal and the delayed signal in response to an MSB-control signal.

19. The butterfly addition/subtraction circuit of claim 18, wherein said circuit serially receives multiple sets of input digits in MSB to LSB order, wherein the MSB-control signal causes each of the switches to pass the input signal received thereby during an initial MSB clock cycle, and wherein the MSB-control signal causes each of the switches to pass the delayed signal received thereby during subsequent clock cycles.

* * * * *